Figure 1:
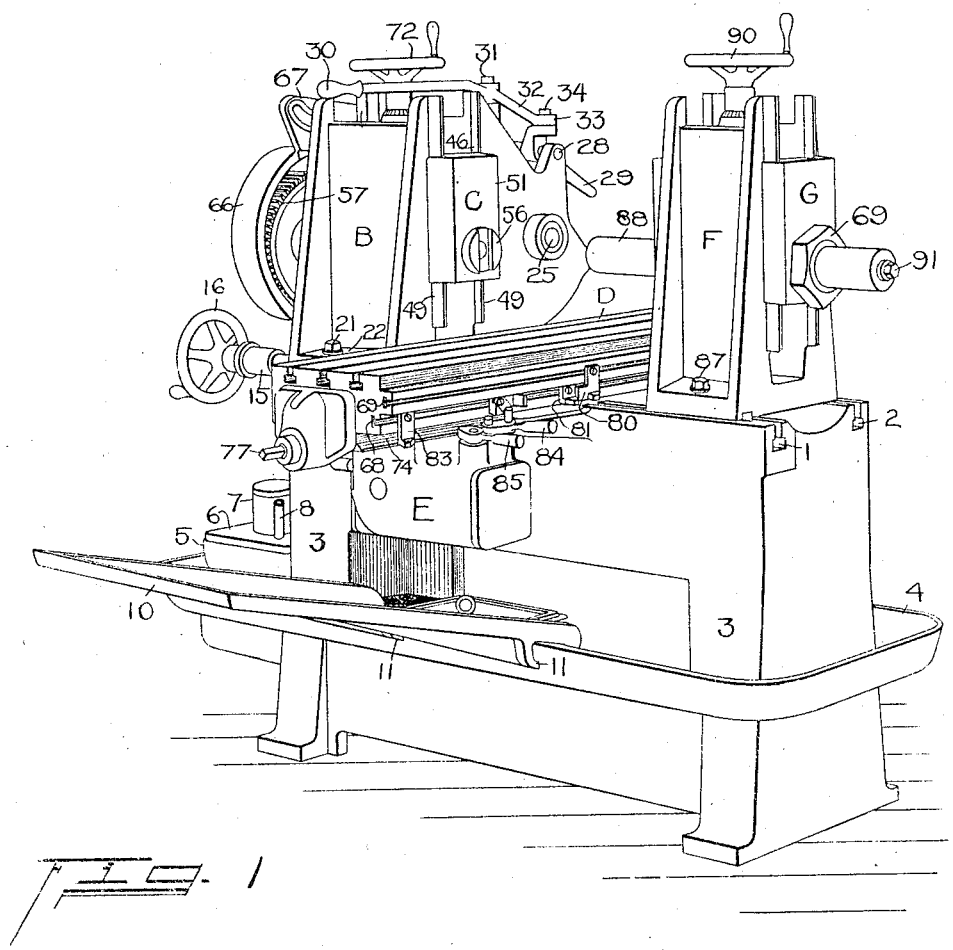

A. L. DE LEEUW.
MACHINE TOOL ORGANIZATION.
APPLICATION FILED OCT. 9, 1914.

1,130,685.

Patented Mar. 2, 1915.
9 SHEETS—SHEET 1.

Witnesses
H. J. Brunjes
B. Cooke

Inventor
Adolph L. de Leeuw
By Blair & Nathan
Attorneys

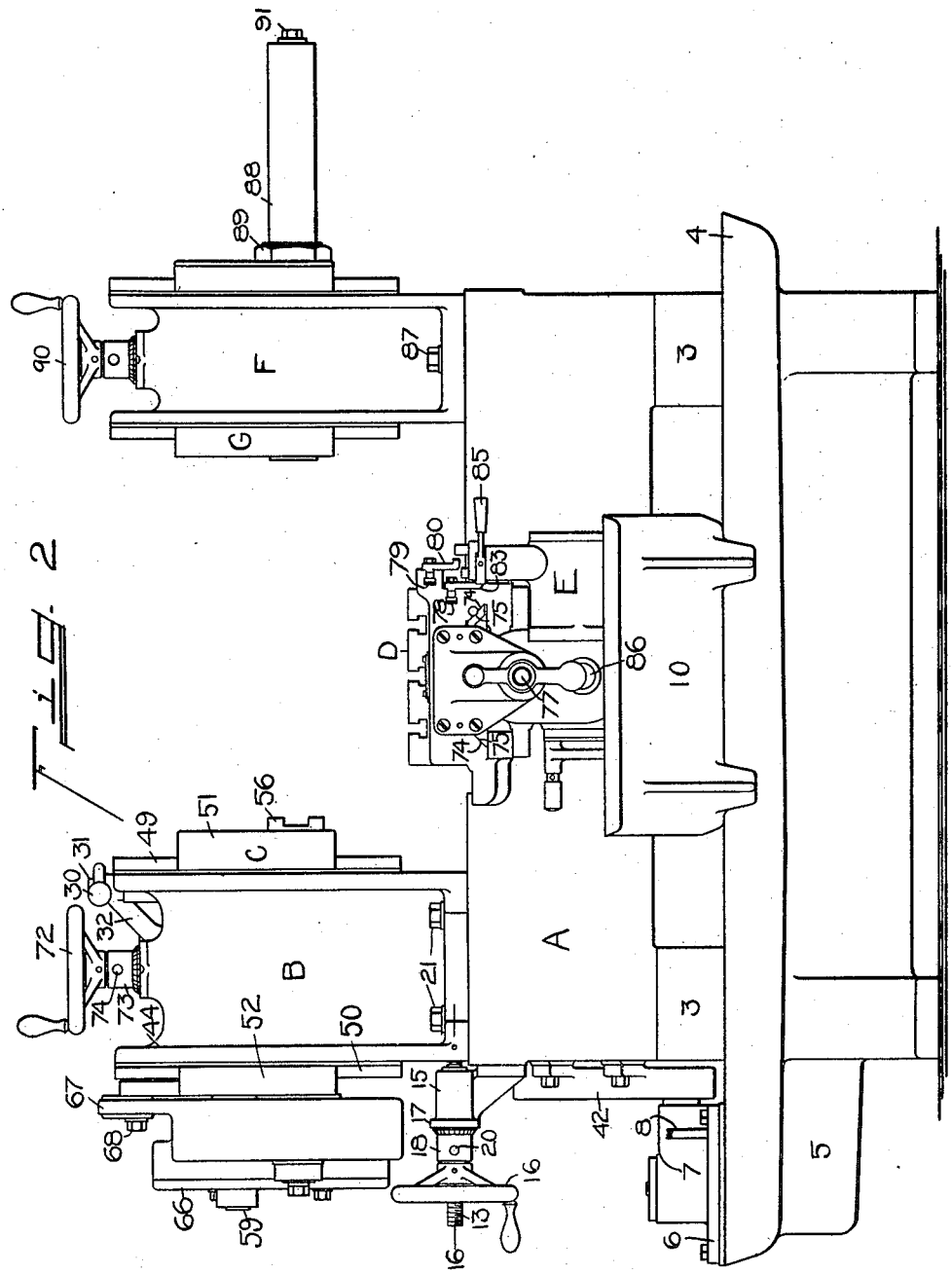

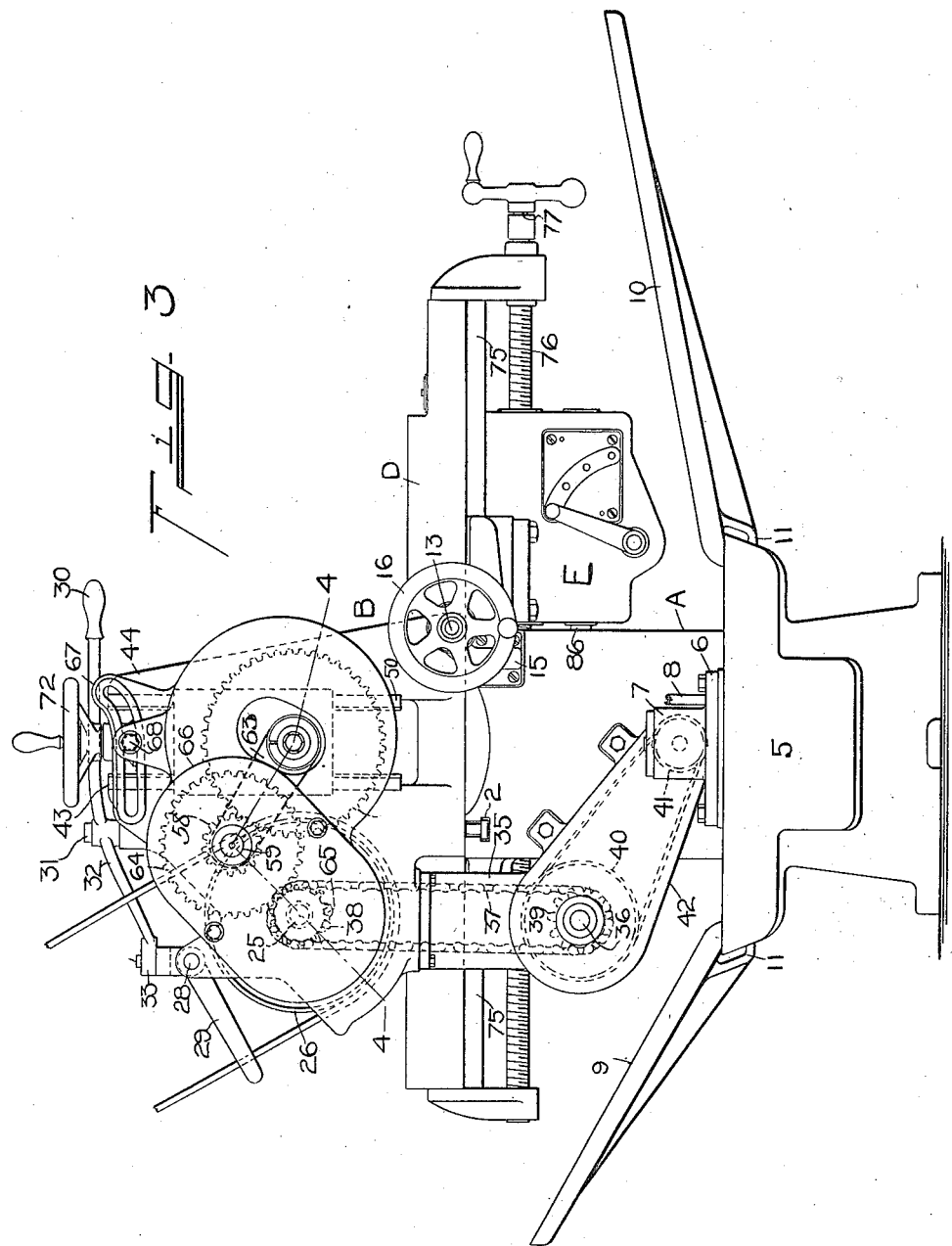

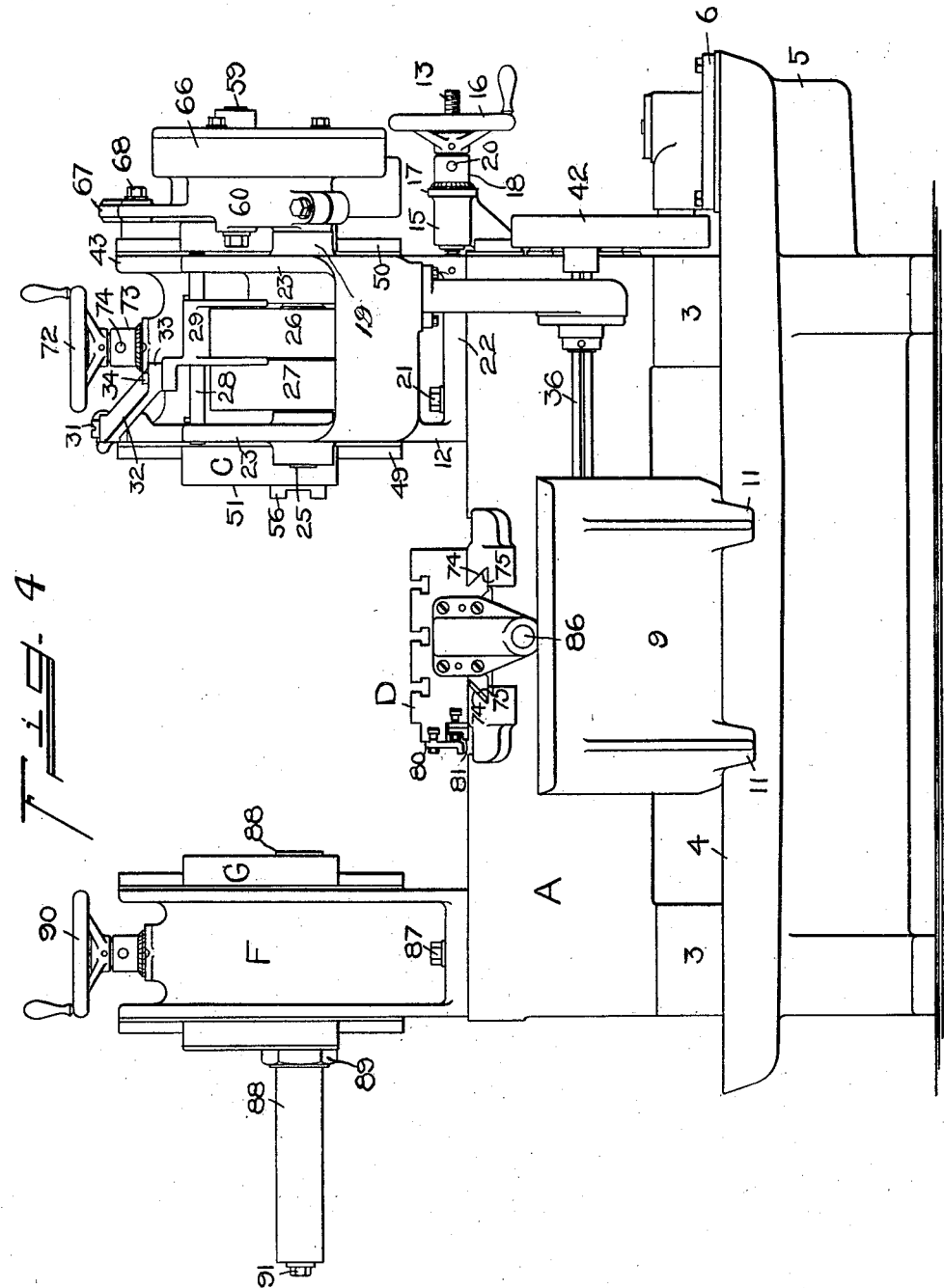

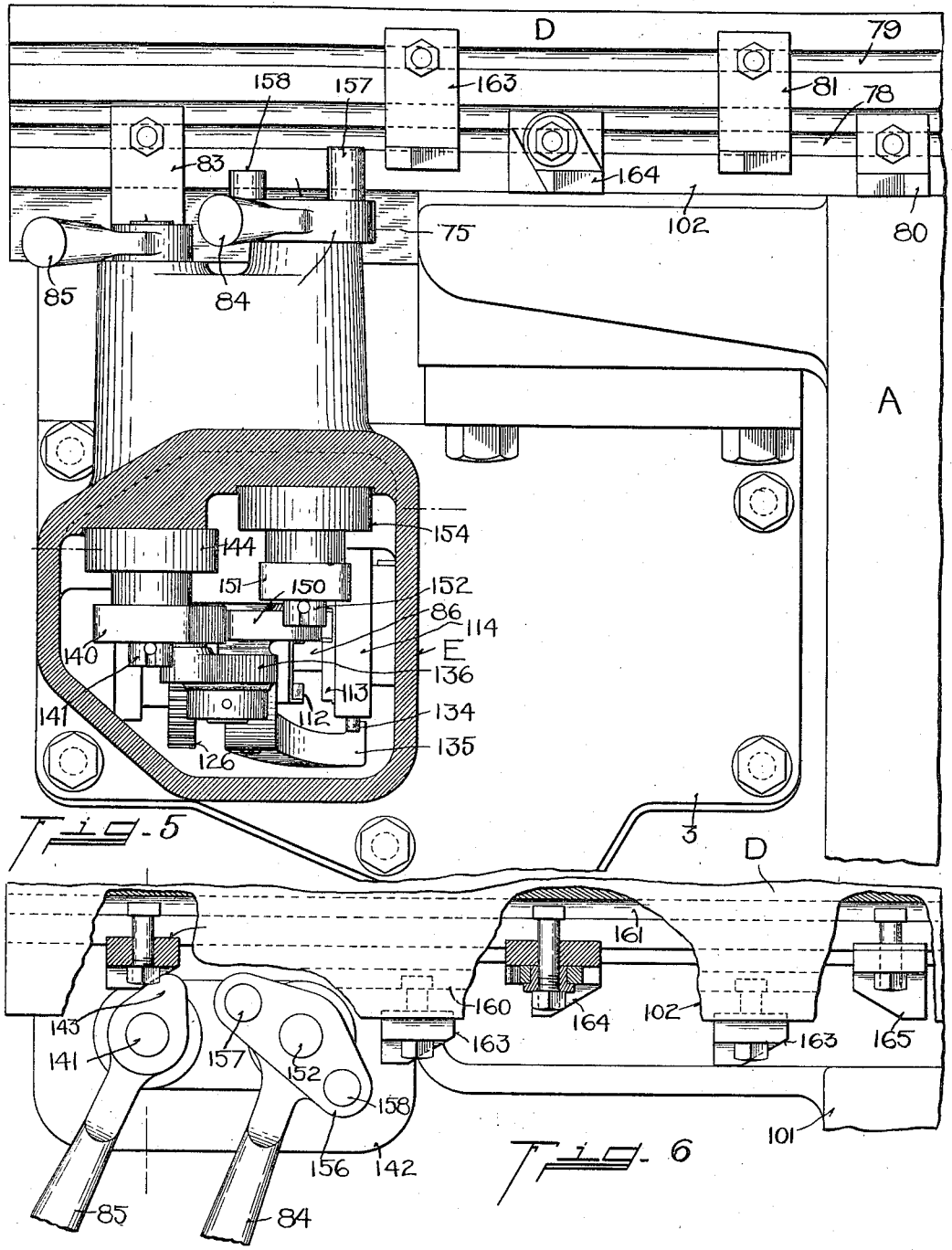

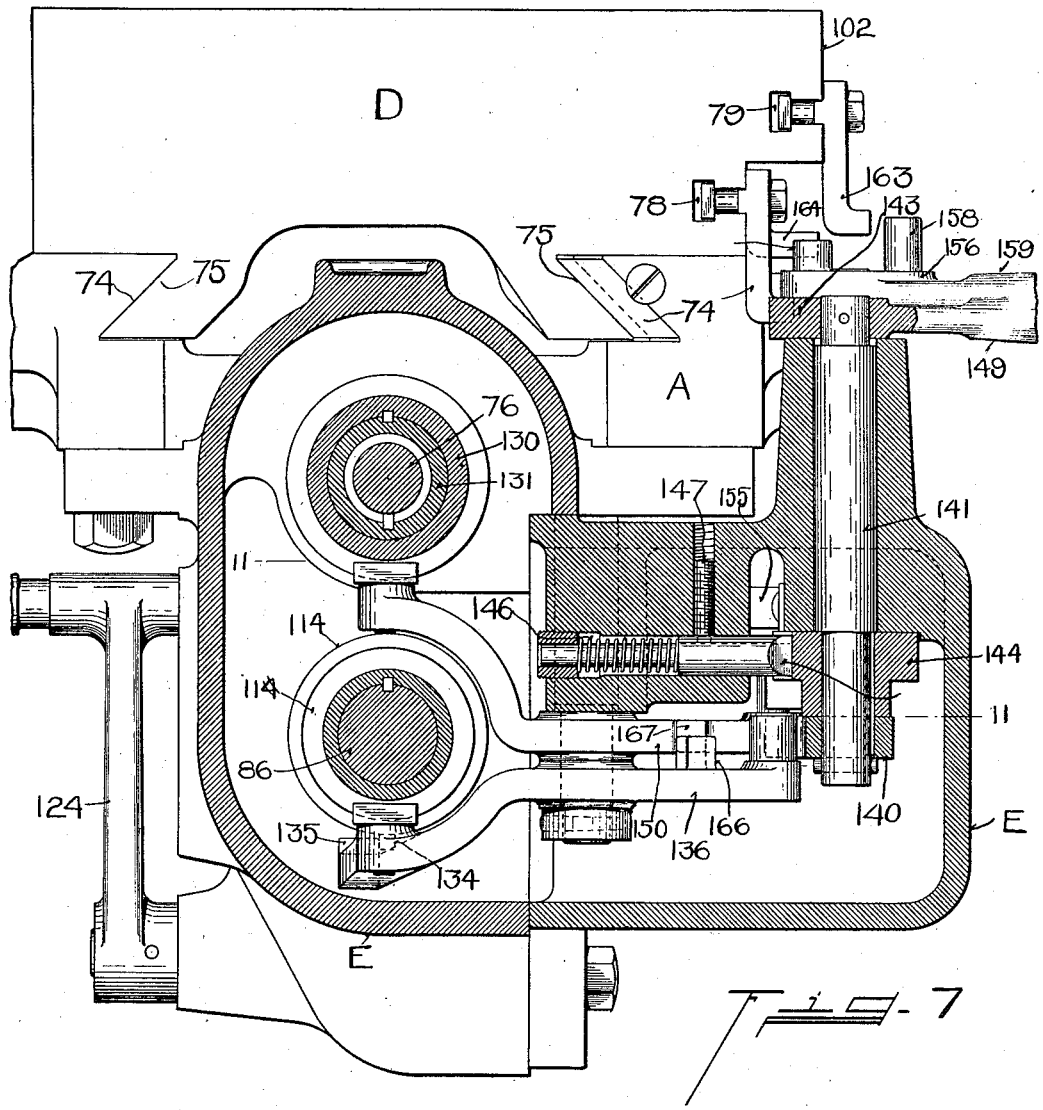

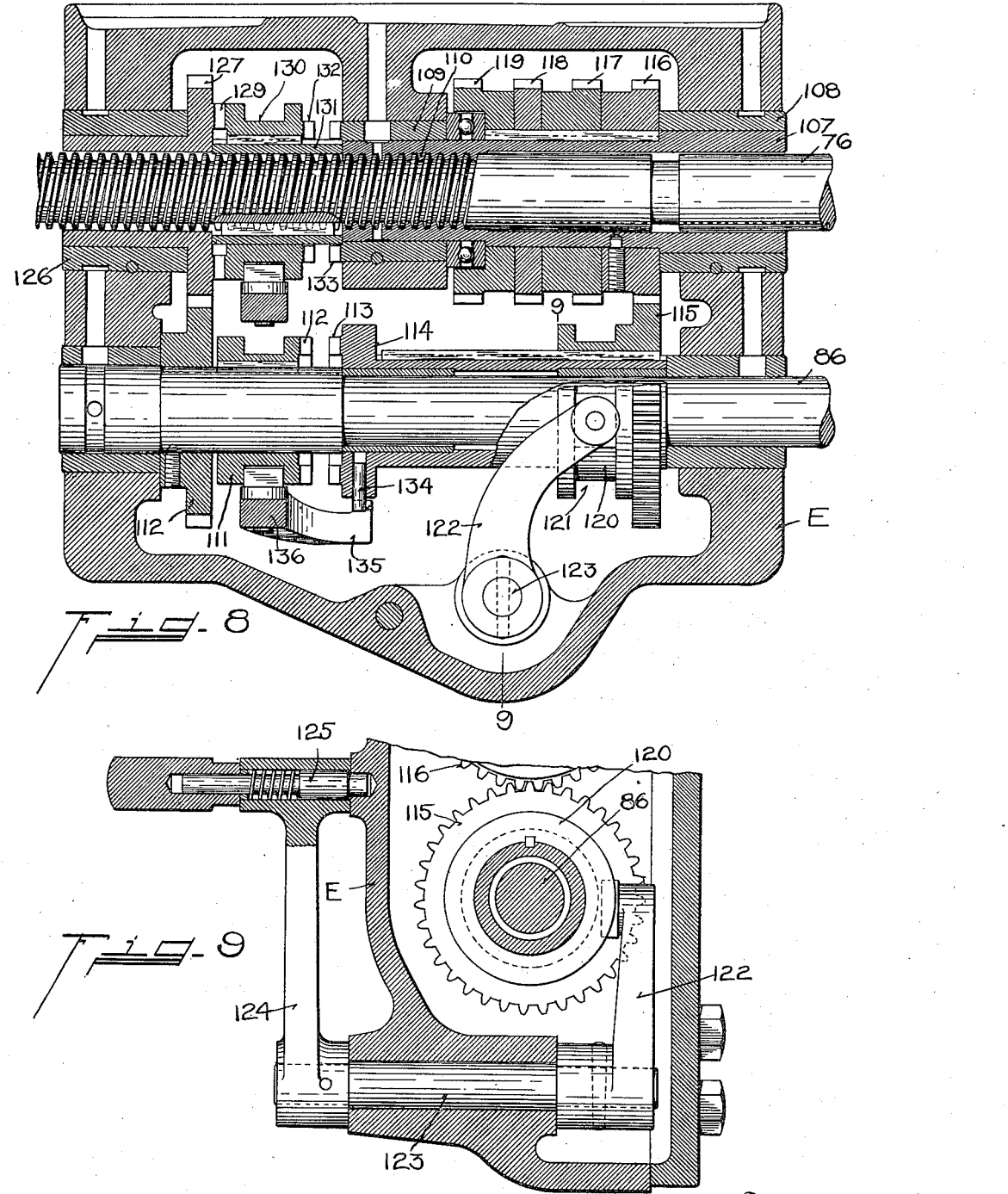

A. L. DE LEEUW.
MACHINE TOOL ORGANIZATION.
APPLICATION FILED OCT. 9, 1914.
1,130,685.
Patented Mar. 2, 1915.
9 SHEETS—SHEET 8.
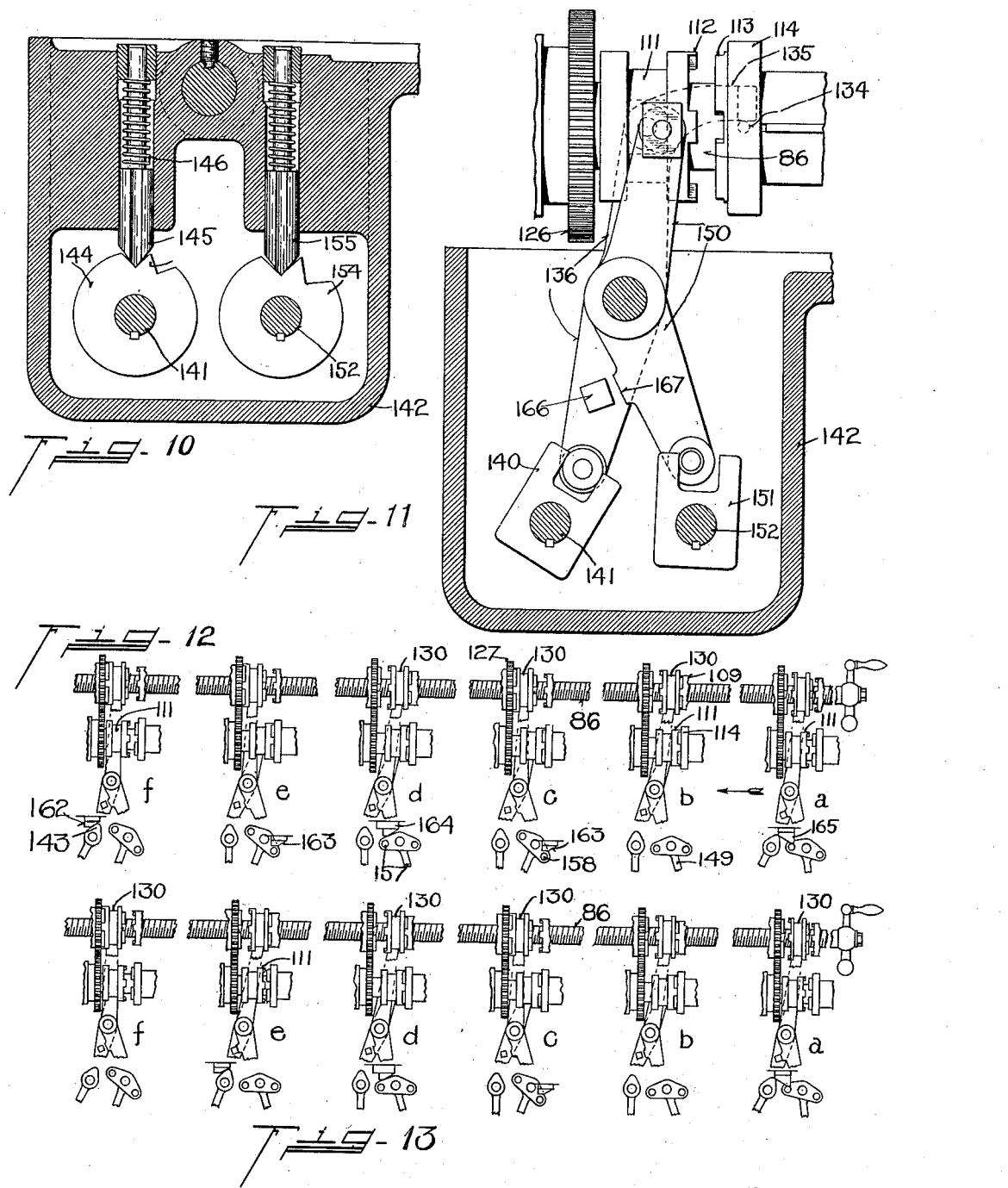

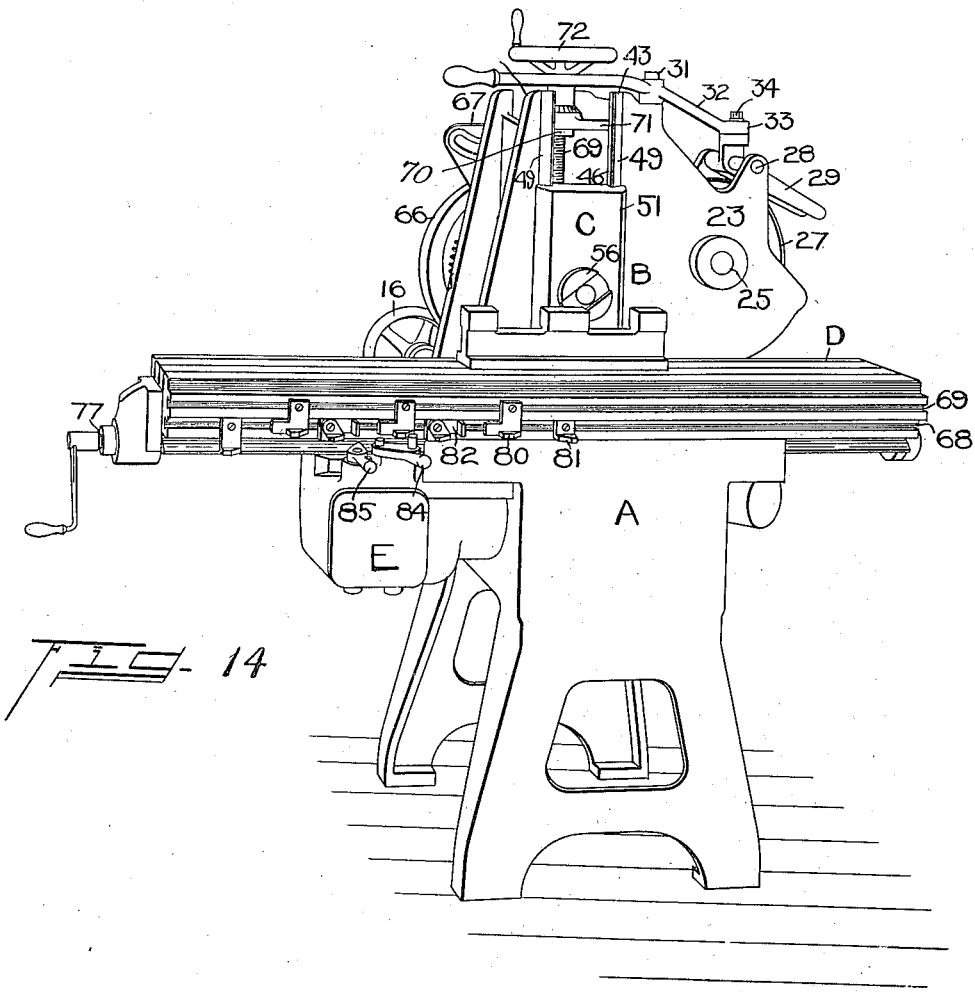

UNITED STATES PATENT OFFICE.

ADOLPH L. DE LEEUW, OF PLAINFIELD, NEW JERSEY, ASSIGNOR TO THE CINCINNATI MILLING MACHINE COMPANY, OF CINCINNATI, OHIO, A CORPORATION OF OHIO.

MACHINE-TOOL ORGANIZATION.

1,130,685.     Specification of Letters Patent.     Patented Mar. 2, 1915.

Application filed October 9, 1914. Serial No. 865,861.

*To all whom it may concern:*

Be it known that I, ADOLPH L. DE LEEUW, a citizen of the United States, and residing at Plainfield, in the county of Union and State of New Jersey, have invented a new and Improved Machine-Tool Organization, of which the following specification is a full disclosure.

One object of this invention is to produce an arrangement in which the attendant, while maintaining his station at the front longitudinal edge of the table, may exercise a very complete control over the machine and whereby the propelling-mechanisms for the work-supporting member and for the tool-supporting member, will be arranged in a very compact relation to one another and individually constituted in a simple manner.

Another object of this invention is to create a more immediate correlation between the table-support, the table-actuating means, the feed-change-mechanism, and the table itself by housing said mechanisms immediately adjacent the table and in a manner supported directly by the table-support in underlying relation with the table.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:—

Figure 1 is a perspective of this machine as viewed from the attendant's normal operating station at the front longitudinal edge of the table showing the accessibility of certain of the control-features. Fig. 2 is a left-hand side elevation of the machine shown by Fig. 1. Fig. 3 is a rear elevation of said machine. Fig. 4 is a right-hand side elevation of the machine. Fig. 5 is an enlarged fragmentary elevation partially in section of the front longitudinal edge of the table showing one arrangement of operating dogs and certain details of the trip-mechanism actuated thereby. Fig. 6 is a fragmentary plan partly in section of the construction shown by Fig. 5. Fig. 7 is an end elevation partly in section through line 7—7 of Fig. 5 showing further details of the trip and control mechanisms. Fig. 8 is a section through line 8—8 of Fig. 7 showing further details of said mechanisms. Fig. 9 is a section through line 9—9 of Fig. 8. Fig. 10 is a sectional plan through line 10—10 of Fig. 7. Fig. 11 is a sectional plan through line 11—11 of Fig. 7. Fig. 12 diagrammatically represents a succession of phases of one of the cycles available for a stroke of the table. Fig. 13 represents another succession of phases constituting another cycle of the table. Fig. 14 is a front perspective of a slight modification of this machine produced by an elimination of the tail stock thereof.

Continuing now by way of a more detailed description, it may at the outset be stated that this invention contemplates a periodically movable tool or work-supporting element, such as a table of a milling-machine, on which are adjustably mounted a plurality of stops or dogs which coöperate with means instrumental in determining the rate at which the table shall travel in accordance with the effect of the dogs. That is to say, it has in objective a series of dogs so constructed and related to a trip-means that one dog may cause the table to execute a quick-traverse, the next dog may cause it to feed, the next again to quick-traverse, the next again to feed and the last to return at a quick-traverse rate. To obtain an adequate understanding of this invention, it should be kept in mind that the term feed as used herein, indicates any one of a series of relatively slow movements all essentially suitable for tooling operations and when the terms "feed-changer" or "feed-change mechanism" are employed, they refer to or include only the mechanism which determines the rate at which the table thus feeds and, when so used they are to be understood as not including the mechanism determining the speed of rotation of the cutter-spindle. So also, the term "quick-traverse"

is indicative of the rapid non-tooling movement whereby the table travels over blank spaces; which movement usually represents the maximum speed at which the table may move and abruptly reverse, stop or moderate to a feed without undue shock to the parts. It is desirable that this fast rate or quick-traverse be the maximum rate permitted by the construction of the table, for the sake of efficiency, and that it be unaffected by changing in the slow speed or feed of the table, such as may be resorted to to meet different tooling conditions. Before outlining the specific features of construction whereby these functions are obtained, it will be convenient first to describe certain main elements of a conventional milling machine. These comprise a table that supports the work and which is reciprocated to and fro to subject the work bolted thereon to the effect of the cutter that is secured to a spindle which is continuously rotated by power derived from the same source or prime-mover that actuates the table. In order to enable the machine properly to execute its functions, these actuated elements must be capable of being brought into adjustable relation with one another in not less than two directions. This is accomplished by an interponent frame-unit that intervenes between the frame-unit A that directly supports the spindle and the frame-unit C that directly mounts the table. In the type of machine here illustrated, the frame-unit A that carries the weight of the table also constitutes the base or bed of the machine. The spindle mounting frame-unit C is carried directly by the interponent frame-unit B which here rests directly on the bed and uprises therefrom in the form of a standard or head. The chief mechanical characteristic of the interponent frame-unit B is that it provides a vertical adjustment as to the spindle-mounting unit A and a horizontal adjustment as to the table-supporting unit A, i. e., making them mutually adjustable, i. e., transversely to one another. Heretofore, the table-propelling mechanism has been located on one or another of the frame-units at a considerable distance from the table and this has resulted in a very considerable inconvenience to the attendant in manipulating the machine, because the operating-levers have been mounted on the housing for the mechanism and quite out of his immediate reach. That is to say, the attendant had to be stationed at the outer longitudinal front-edge of the reciprocating-table in order properly to scrutinize the action of the machine, but when so stationed the feed-changing levers were beyond his reach so that he had to shift his position.

Now, this invention proposes, among other things a re-arrangement and a reconstruction of the control-elements so as to centralize them immediately adjacent the table and so as to free remote portions of the machine from the mechanism that governs the rate at which the table shall feed and so to locate said mechanism and so to combine it with certain automatic control-features that the attendant, when stationed immediately adjacent the reciprocating-table and without leaving the table, will be able, first to change the rate at which the table feeds, i. e., to vary its speed during a cutting-stroke; second, to cause the table to make a quick-traverse, i. e., to shift quickly during a non-tooling interval; third, to change the direction of movement either of the feed or of the quick-traverse; and fourth, to stop the movement of the table. In carrying out this aspect of this invention, one of the frame-units carrying the weight of the table may assume any conventional proportions or configuration, such as are indicated on the drawings, but with this distinction, that it is contrived also to support or carry the weight of what may be termed a "feed-change box," i. e., the casing and elements constituting a change-gear mechanism such that the rate of feed may be varied at will; and it is also contrived so that this box shall be positioned immediately to underlie the table.

The bed A consists of a heavy frame providing guidways 1 and 2 in its upper surface for positioning the head and tail-stock of the tool. This bed is supported on legs 3 and it rises from a pan 4 that is adapted to receive any oil flowing down the legs or dripping from the bed, and to drain the same into an oil well 5 here in the form of a box cast integrally with the legs and the pan 4 in a manner more clearly shown by the drawings. This oil well has an opening to receive the oil drained by the pan and as to its operative features is more fully described in my copending application, Serial No. 776017, filed June 27, 1913, they will not here be detailed. A casting 6 forming a cover plate and a housing for the operative features is bolted to the box 5 and it provides a part 7 that journals the propelling shaft of the pump. A pipe 8 extends through this top casting 6 and receives the oil delivered by the pump and conveys it to certain wearing surfaces of the machine, as will be hereinafter more fully outlined. For the purpose of catching residues dripping from the overhanging portions of the table, chutes 9 and 10 may project laterally from the pan 4 and preferably are detachably mounted on the same by means of lugs 11 extending from their under sides and receiving the edges of the pan 4.

The head B consists of a main casting 12, the bottom of which is finished to interfit with the slide-ways 1 and 2 of the bed, and this head is adjustable along said slide-ways, and to enable it to be moved conveniently, a screw 13 is keyed to the casting 12 and projects through a nut 14 journaled in a bracket 15 extending from the bed. This nut 14 is in turn rotated by a hand-wheel 16 to enable the extent of movement accurately to be determined a peripheral part 17 on the bracket coöperates with a member 18 rotatable with the nut and by means of graduations on these respective elements, the extent of rotation may be accurately determined. The part 18 is preferably journaled on the wheel supporting shank piece 19 and is capable of being temporarily fixed in any desired position by means of a thumb-screw 20 so that the zero setting of the graduations may be arbitratily made at any position of the casting 12 on the bed. To enable the head to be locked on the bed, one or more T-bolts and nuts 21 pass through holes in a flange 22 of the head and coöperate with the underlying slots of the guide-ways 1 and 2, and thus enable the casting to be drawn tightly onto the bed.

Extending at one side of the casting 12 are two walls 23, which, together with an end wall 24 form a pocket for draining oil, and also form bearings for the driving pulley shaft 25. This shaft is journaled at one end in the inside wall 23 and its other end projects through the outside wall and supports certain means for transmitting motion to the spindle, as will be hereinafter described. Keyed to the shaft 25 is a driving pulley 26, and loosely mounted concentrically with said shaft is a loose pulley 27.

Slidably mounted on a shaft 28 supported by the walls 23 is a belt shifting fork 29 which is reciprocated by a handle 30 at the end of a lever pivoted at 31 to the main head casting and having an operating arm 32 terminating in a slotted end 33 receiving a stud 34 projecting from the fork 29.

Depending from the casting 12 radially from the shaft 25 is a tubular bracket 35 in the lower end of which is journaled a shaft 36 which is driven by the sprocket chain 37 riding from sprocket 38 on the pulley shaft 25, and sprocket 39 on the shaft 36, which conveys the power for feeding the table and also provides for the operation of the oil pump. This latter is accomplished by means of a pulley 40 mounted on its end, which coöperates with a corresponding pulley 41 on the driving shaft of the pump. A casing 42 is bolted to the bed and incloses the belt and pulleys, and it is to be noted that the sprocket 37 is splined to the shaft 36 so as to permit of bodily movement of the bracket 35 and its contained elements axially of the shaft 36.

The spindle carrier C consists of a block in which is journaled the spindle, and which is slidably adjustable on the head B in a direction toward and away from the plane of the table. This spindle carrier extends between legs 43 and 44 provided by the bifurcated head B. The latter preferably provides four parallel bearing surfaces 45—46—47 and 48 normally each in close proximity with corresponding bearing surfaces provided by the spindle carrier C, and each arranged in widely separated pairs. Oppositely converging pairs of bearing faces 49 and 50 are also provided by the legs 43 and 44 and the inner pair 49 coöperate with similar bearing faces on the head 51 of the spindle carrier C. A pressure member 52 is slidably mounted on a stud 53 extending rearwardly from the spindle carrier C and a clamp nut 54 screw-threaded to said stud enables the clamping member 52 to be forced toward the elongated head 51. By reason of a slight spring in the legs 43 and 44 of the head casting B, all of the bearing surfaces are brought into tight binding relation and a most rigid mounting is provided.

The spindle support C is apertured and a suitable spindle 56 is journaled in the same and is driven by a gear 57 keyed to its outer end. This gear in turn meshes with an intermediate 58 that is mounted on a stud 59 carried by an arm 60 pivoted to a part 61 concentric with the pulley shaft 25. A link 63 maintains coincidence of the pitch lines between the gears 57 and 58, and the latter is fast to a gear 64 that is maintained in proper pitch relation with a pinion 65 by means of the arm 60, as will be understood. A housing 66 is secured to the arm 60 and protects the gears, and for the purpose of more rigidly supporting it after the parts have been adjusted it is provided with an extension 67 having a slot receiving a bolt 68 extending from the support, and which may be tightened up to secure all of said parts rigidly together.

It will be perceived that the organization of the head thus far described permits of any desired adjustment of the spindle, and at the same time maintains a positive direct drive for the same in all of its positions and also enables the same to be most rigidly clamped in any of its positions. The means for moving the spindle support consists of a screw 69 pinned to the support and extending vertically through a nut 70 (see Fig. 14) mounted in a cross-yoke 71 and turned by means of a hand-wheel 72. This wheel provides an adjustable collar 73 with a lug screw 74 for enabling micrometer adjustments to be obtained in the manner recited in connection with the hand-wheel 16.

It is noteworthy that the power control hand 30 for shifting the driving belt as well as the handle 72 for the vertical adjustment of the spindle carrier, and also the hand wheel 16 for effecting a transverse movement of the head on the bed which is accessible to the operator at the front of the machine, that is, at the same side of the machine providing handles for controlling the movements of the table. The mounting and arrangement of this plate may now be described.

The table D as here shown is elongated and adapted to reciprocate transversely to the bed, it being slidably mounted thereon by means of suitable guide-ways 74, said table having counterpart guide-ways 75 in its under face. A feed-screw 76 is journaled at its ends in said table, and the front end 77 of the feed screw projects slightly and is contoured to receive an operating handle or wheel to permit of hand actuation should that be desired. Extending along one side of this table are two slots 78—79 located in different planes and which adjustably carry dogs 80—81—82 and 83 which automatically actuate control levers 84 and 85 uprising from a speed change box E that is arranged at the front side of the bed A underneath the table D, and which receives power by means of a shaft 86 extending transversely through the bed parallel with the table and geared at its rear-end to the shaft 36 previously described.

The foregoing organization will be complete for many classes of work, but to satisfy other requirements, the bed A may extend beyond the tripping side of the table D, and on the same may be mounted a head and spindle organization duplicating that already described, or a tail stock for supporting an arbor may be used according to the following construction.

The tail stock F consists of a bifurcated casting having an interfitting relation with grooves in the bed and adapted to be held in place by means of bolts 87 in a way similar to that already described. An arbor support 88 is mounted in a carrier G, which is in turn vertically adjustable in the tail-stock F, and is adapted to be locked in place by means of a clamp-nut 89, the construction in this respect being similar to that already described in connection with the parts B and C. A hand wheel 90 is provided to enable the necessary refinement or movements of the arbor-support 88 to be made. The main power-driving shaft 86 is suitably journaled within the casing, and is in driving connection with the main source of power of the machine through the elements illustrated. The feed-screw shaft 76 is suitably journaled at each end of the carriage or table D and it is engaged therewith and projects through the casing E. A nut 107 is journaled within the bearing sleeves 108 and 109 that are suitably fixed within boxes formed in the casing E. In this instance, the nut 107 is of elongated form and only a portion thereof is provided with the screw-threads 110, which engage with the threads of the screw-feed shaft 86. By this construction, the nut 107 is given a considerable bearing surface; which is always an important consideration in supporting the rotating elements of a machine tool, as it tends to prevent vibration or chatter, and to prolong the life of the machine.

A clutch-collar 111 is splined upon the shaft 86 and is provided with clutch-teeth 112 adapted to be engaged with the clutch-teeth 113 formed on the sleeve 114, which in turn is loosely supported upon the driving shaft 86. A gear 115 is splined upon the sleeve 114 and is adapted to be slid thereon to enable the gear 115 to be engaged with any one of the gears 116, 117, 118 and 119, fixed upon the nut 107 to impart any one of a variety of speeds to the nut.

As illustrated, the gears 116, 117, 118, and 119 are of the same diameter, but each has a different number of teeth. This will give the results (when this system is employed) desired for a feeding mechanism; and it has the advantage of enabling the gear 115 to be shifted laterally into direct engagement with any one of the gears of the series without using complicated tumblers. By the form herein illustrated, there is produced a simple and compact arrangement, with very few parts, but it is obvious that other systems of speed-change gearing can be employed between the nut and driving shaft to produce equal results.

The gear 115 is provided with a hub extension 120 having an annular groove 121, into which the arm 122 of the shifting-mechanism engages. The arm 122 is fixed to a rock-shaft 123, journaled within a bearing formed in the casing E, and projecting through the same, and 124 represents a hand lever fixed to the rock shaft, with its opposite end provided with a detent mechanism 125 for locking the handle, gear and shifting mechanism in any adjusted position.

A gear 126 is fixed to the feed-shaft 186 in mesh with a gear 127 loosely journaled within the bearing sleeve 128 fixed within the frame E, with the screw projected through the bore of the gear 127, and substantially free therewith. The gear 127 is provided with clutch-teeth adapted to engage with clutch-teeth 129 formed on the clutch-collar 130, splined upon the sleeve 131, said sleeve 131 in turn being keyed, or splined on the screw shaft 76. The sleeve 131 is provided to secure free and easy movement in the shifting actions of the clutch-collar 130 and it also conforms to better practice, than by sliding the collar 130 directly upon the screw. When the clutch-collar 130 is thrown to the left into engagement with the gear 127, the screw is in driving connection with the shaft 86 for revolving the screw.

It is desirable to lock either the screw-shaft or nut against rotation while one or the other is rotating, and this is accomplished as follows:—Upon the opposite face of the clutch-collar 130, are provided clutch-teeth 132 adapted to engage with teeth 133 formed in the bearing-sleeve 109 which is held against rotation, or fixed within the bearings of the frame E. As the clutch-member 130 is keyed indirectly through the sleeve 131 to the screw-shaft 76, it will be seen that when the teeth of the clutch-collar 130 are engaged with the teeth of the bearing-sleeve 109, the screw 76 will be locked against rotation, and that such position of the collar is opposite from its engagement with the gear 127 when in driving connection, whereby it is impossible to lock the screw against rotation, and at the same time maintain it in driving connection. The nut is locked by providing the sleeve 114 with a pin 134 projecting therefrom, and adapted to engage with an arm 135 projecting from the clutch-shifting lever 136 moving in the path of rotation of the pin when the lever is swung to a position disengaging the clutch 11 from the sleeve 114. This construction likewise prevents the sleeve 114 from being simultaneously locked and engaged to the driving shaft 86.

The operation of positively locking the screw and nut, whenever they are idle, while not essential in certain instances when the parts are quite free to move relatively to one another (since the one will not have a rotative tendency upon the other) but in other instances, the parts may become slightly bound, and this will cause the one to rotate the other in such a way as to disturb the feed and injure the work. Therefore, as a precautionary measure, a locking means is provided. It is obvious that the construction herein illustrated can be variously modified, and therefore, I do not wish to be limited to any specific form.

Under the control of the clutch members 111 and 130, the various forward and reverse feeds are obtained. By providing means for shifting these clutches under the actuation of the carriage or feed-member, the feeds can be automatically controlled. A variety of results is made possible, by this invention, by determining the manner of shifting the two clutches. By this invention, the travel of the carriage can be governed or controlled so as to be fed to the work very fast, until it reaches a point where the cutting is to commence; whereupon, the nut is to be driven and the screw is to remain at rest. By throwing the shaft into driving connection with both screw and nut, a slow forward feed is produced and maintained throughout the cutting operation. Thereafter, the screw will again be disengaged, and the nut will remain operatively connected with the propelling elements, and this results in a fast forward feed, and is in turn followed by a second slow forward feed, thereupon, when the nut is disengaged, a return travel of the carriage is produced, and then by disengaging the screw, the carriage will be automatically brought to rest in its initial starting position.

During the movements of the carriage just described, two differently positioned pieces of work, one in advance of the other, were subjected to the action of the cutter. Of course, this number can be multiplied, to any extent, depending upon the length of travel of the carriage and the size of the work. Again, should but one piece of work be supported upon the table, the carriage could be given a forward quick-traverse, to bring the work to the cutter, and then it could feed during the cutting action; after which the carriage could be stopped or returned to normal. A variety of such results is possible, depending largely upon the kind of work machined.

The following mechanism is provided for automatically controlling the clutch member 111:—A lever 136 is suitably pivoted within the frame 142; one end engaging with the annular groove of the clutch member 111, and the opposite end engaging with a forked plate 140 fixed upon the rock shaft 141, which projects vertically and is journaled within a bearing formed in the supplemental-casing 142 fixed to the main-casing E. An arm 143 is fixed upon the rock-shaft 141 and is adapted to be engaged by a dog or dogs projecting from the carriage to rock the shaft 141, and shift the lever 136 in the desired direction either to engage or disengage the clutch member 111 with the sleeve 114, for controlling the rotation of the nut. To insure a shifting of the clutch, means are provided for automatically rocking the shaft 141 after a given positive movement thereof. A toothed-disk 144 is fixed to the rock shaft 141. A toothed detent pin 145 is slidably mounted within the frame 142, and urged outwardly by means of the spring 146, and there held against rotation by means of a set-screw 147 threaded within the frame 142 and engaging into a groove formed in the detent pin 145. Thus, in rocking the shaft 141, say toward the left, the detent will ride upon the tooth 148 of the disk 144, until the apexes thereof engage with each other and bring the apex of the detent pin 145 upon the opposite angle of the tooth, at which position the tripping-dog of the carriage has moved the rock-shaft and clutch to a point where the clutch has just disengaged from its opposing clutch member, whence the tension of spring 146 will be exerted and move the clutch-member the remainder movement required. Owing to the clutch member being released from its driving connection with the driven member, very little power is required to throw the clutch. This is also true when the clutch is shifted in the opposite direction after the clutch teeth have initially been engaged. The rearward portion of the arm 143 is provided with a handle 149, whereby the clutch 111 can be manually controlled.

The clutch-member 130 has similar mechanism to that described for the clutch-member 111, to control the same, and is comprised of the following instrumentalities: A lever 50 is pivoted upon the same axis as lever 136, with one end thereof engaged within the annular groove formed within the clutch member 130. The opposite end engages with a forked plate 151 which is fixed to a rock-shaft 152, but the connection between lever 150 and the forked-plate is such as to provide idle or lost motion between the members in order to insure the proper movement of the clutch-member 130, for the reason that it engages clutch teeth at the limits of both movements thereof, right and left. The rock-shaft 152 is provided with a toothed-disk 154 like that of the rock-shaft 141. A spring controlled detent-pin 155 engages with the tooth or teeth of the disk and performs the same functions and operations I have described for similar mechanism of clutch 111. A lever 156 is fixed to the rock shaft 152 and is provided with the different height pins 157 and 158 adapted to be respectively engaged by dogs projected from the carriage for shifting the lever 156 into alternate positions, according to which of the pins is engaged. The lever 156 is also provided with a handle 159 for manually controlling the clutch-member 130. As illustrated in the drawings, three sets of tripping dogs are provided; one for tripping the clutch-member 111; the second for engaging the pin 157 for shifting the arm 158 in one direction; and the third for engaging the pin 158 to shift the arm or lever 156 in an opposite direction. The table or carriage is provided with two longitudinal grooves or T-ways 160 and 161 to receive the clamping bolts of the respective tripping dogs 162, 163 and 164, arranged at predetermined points for automatically controlling the carriage travel or feed. The trip dog 162 (of the first series) engages the arm 143 to actuate the clutch-member 111 to control the nut. The trip dog 163 engages the pin 158 of the lever 156 to throw the clutch-member 80 to the left to bring it into driving relation with the screw. The trip dog 164 (of another series) engages the pin 157 and throws the clutch 130 in an opposite direction; thus locking the screw against rotation.

The trip dogs 164 can be arranged to swing, when a number of them are employed, so as to move out of position during a return travel of the carriage, when the stops are arranged to return the carriage upon the completion of the working movements of the carriage. It is obvious that, while these dogs are shown arranged in different longitudinal planes, and each are shown provided with a laterally projecting cam-surface adapted to engage the tripping parts of the respective clutches, the construction of the dogs can be variously modified and positioned upon the carriage, otherwise than herein shown but within the scope of the claims. Several diagrammatic arrangements are also illustrated two different ways of controlling the carriage travel, and will promote a clear understanding of the operation of the automatic trip mechanism. With the carriage traveling in the direction shown by the arrow, Fig. 12, $a$ represents the first position of the clutches, both being disengaged and the carriage being at rest. By shifting the handle 149 to the right by hand, the clutch-member 111 will be engaged with the sleeve 114, thereby driving the nut. This position enables the clutch-member 130 to become engaged with the lock-sleeve 109, thereby locking the screw against rotation and producing a fast forward speed, the members being in position as shown at $b$. After the carriage has moved a predetermined distance toward the work, the pin 158 engages a tripping dog 163, which will throw the clutch-member 130 into engagement with the gear 127, thereby producing a slow forward feed. The various elements will occupy the position shown at $c$ in Fig. 12, so as to feed the carriage slowly during the cutting operation. After this, the clutch-member 130 will be again disengaged by a trip dog 164 which engages a pin 157 of the lever 156. The shifting elements will now occupy the position shown at $d$, and thereby produce a fast forward feed for the predetermined distance, thereupon the clutch-member 130 will be again thrown into a position to rotate the screw and yield a second slow forward feed, as at $e$. A dog 162 is now enabled to engage the arm 143, so as to disengage the clutch-member 111 still remaining in driving relation with the screw-shaft. The various shifting elements now occupying the position shown at $f$, which produces a quick return. At the end of the return stroke, a trip dog 165 is enabled to disengage the driving capacity of the screw and bring the carriage to rest.

In Fig. 13, $a$ shows the parts in idle position. $b$ illustrates the clutch members when they have been shifted for producing a fast forward movement; which shifting is done manually. The position of the clutch 130 to produce a slow forward feed, is shown by $c$. The position of the clutch for yielding a fast forward is shown by $d$ the clutch 130 being disengaged. The position of the clutch 111 which brings the carriage is shown by *e*. The position given manually to the clutch 130 to produce a quick return is shown by *f*; and at the end of the return stroke of the table, the clutch 130 is disengaged from the screw-shaft, thus bringing the carriage to a rest. This latter system of carriage-control is one in which it is necessary to remove the work, or adjust the cutter so as not to engage the work on the return stroke; while in the system of Fig. 12, the work and cutters are of such nature as to enable the carriage to be automatically returned to normal, without injury to the work or cutting tool.

To prevent the screw shaft from being locked against rotation, while the nut is at rest for a hand-feed, I provide the following mechanism or means: The lever 136 for shifting the clutch 111, is provided with a projecting lug 166 adapted to engage with a boss 167 projected from one side of the lever 150, provided for shifting the clutch member 130, whereby it will be seen that it will be impossible to throw clutch member 30 into its screw shaft locking position, while the nut is at rest. As will be clearly seen from Fig. 1, the two levers will engage with each other, by bringing the boss and lug of the respective levers into abutment. Should either of them be moved toward the other, the nut would be thrown into driving connection, thereby producing a power feed, and before the same could be fed manually, it would be necessary to move the clutch-shifting lever of the clutch 130 to a position to disengage the same from its screw-shaft locking position. This forms a safety means for locking the screw-shaft against rotation, when it is desired to rotate the same by hand.

Having thus revealed this invention, I claim as new and desire to secure the following combinations of elements by Letters Patent of the United States:—

1. A machine-tool organization combining a frame-unit providing a first slide-way and also providing a second slide-way disposed transversely to said first slide-way; a feed-change mechanism carried by said frame-unit and located at one end of said first slide-way; a table overlying said first slide-way and adapted to feed in the direction thereof and over said feed-change mechanism; another frame-unit coöperating with said second slide-way; a tool-supporting member; means for mounting said tool-supporting member on said other frame-unit; hand-operating means carried by said first-mentioned frame-unit for manually controlling said feed-change mechanism; and a transmission extending through said feed-change mechanism for propelling the table at the rate of feed determined thereby.

2. A machine-tool of the nature disclosed combining a bed; a power-driven shaft extending therethrough and terminating at the front of the bed; a table slidable on said bed over said shaft; a feed-screw journaled on and reciprocating with said table and located over said shaft; a feed-change box mounted at the front of said bed underneath said table and establishing connection between said shaft and feed-screw; operating instrumentalities extending from said feed change-box and located at one side of the longitudinal edge of said table, and automatic trip means adjustably mounted at the longitudinal edge of said table and adapted to actuate said instrumentalities.

3. A machine-tool organization combining a spindle-supporting member; a spindle in journaled relation with said member; a table; means intervening between the table and the spindle-supporting member and providing for relative movements between said spindle and table in a vertical and in a horizontal direction transverse to the spindle; a feed-change mechanism arranged below said table and adapted to effect a relative feed between said table and said spindle in one of said directions; and a manually operable element arranged at the front of the machine-tool and constituting means for controlling said feed change mechanism, whereby the rate of relative feed between the spindle and table may be varied.

4. A machine-tool of the nature disclosed combining an elongated bed; a power-driven shaft journaled transversely in the bed and terminating at the front thereof; a table slidable transversely on the bed; a feed-screw journaled on and reciprocating with said table and overlying said shaft in parallelism therewith; a speed-change box into which both said feed-screw and shaft extend and establishing operative connection therebetween; an operating instrumentality uprising from said box at one side of and closely adjacent the longitudinal edge of said table; and automatic trip means adjustably mounted at the longitudinal edge of said table and adapted to actuate said instrumentality.

5. A machine-tool organization combining a tool-supporting member; a table; a first frame-unit on which said member is mounted; a second frame-unit slidably supporting said first frame-unit whereby the distance between said tool-supporting member and said table may be varied; means comprising another frame-unit intervening between said table and said second frame-unit and constructed to provide for a relative movement in two transverse horizontal directions between said table and tool-supporting member; a feed-change mechanism mounted directly on said last-mentioned frame-unit in underlying relation with the path of feed of said table; a prime-mover mounted on said second frame-unit; and a transmission extending from said prime-mover through said feed-change mechanism to said table to propel it at a rate determined by said feed-change mechanism; and means mounted at the side of said last-mentioned frame-unit for manually adjusting said feed-change mechanism.

6. A machine-tool organization combining a spindle-supporting member; a spindle in journaled relation with said member; a table having a slide-way in its bottom-face; a frame-unit constituting a foundation for the machine-tool and adjustably supporting the weight of said parts; a feed-change mechanism carried by said foundation frame-unit and positioned adjacent the bottom-face of said table but out of the path of movement thereof; a table-propelling transmission extending through said feed-change mechanism to said table to effect a relative feed of said table at a rate determined by said feed-change mechanism; and a manually-operable element arranged immediately adjacent said table and constituting means for controlling said feed-change mechanism, whereby the rate of relative feed between the spindle and the table may be varied.

7. A machine-tool organization combining a frame-unit providing a first horizontal slide-way and a second horizontal slide-way disposed transversely to said first slide-way; a feed-change mechanism carried by said frame-unit and located adjacent one end of said first slide-way in lateral relation with said second slide-way; a table overlying said first slide-way and connected therewith to feed in the direction thereof; another frame-unit coöperating with said second slide-way; a tool-supporting member; means for mounting said tool-supporting member on said other frame-unit; hand-operating means carried by said first-mentioned frame-unit for manually controlling said feed-change mechanism; and a transmission extending through said feed-change mechanism for propelling the table at the rate of feed determined thereby.

8. A machine-tool of the nature disclosed combining a first frame-unit; a prime-mover mounted thereon; a second frame-unit slidable with relation to said first frame-unit; a power-driven transmission extending from said prime-mover and terminating at one side of said second frame-unit; a table slidable on said second frame-unit; a feed-screw journaled on and reciprocating with said table; a feed-change box mounted at the said side of said frame-unit underneath said table and establishing connection between said transmission and feed-screw; and hand-operating instrumentalities extending from said feed-change box and located at one side of the longitudinal edge of said table.

9. A machine-tool organization combining a spindle-supporting member; a spindle in journaled relation with said member; a table; means intervening between the table and the spindle-supporting member and providing for relative movement between said spindle and table in a vertical and in a horizontal direction transverse to the spindle; a casing mounted on said means at one side of the machine-tool and below said table; a feed-change mechanism housed by said casing and adapted to effect a relative feed between said table and said spindle in one of said directions; and a manually operable element arranged at the front of the machine-tool and constituting means for controlling said feed-change mechanism, whereby the rate of relative feed between the spindle and table may be varied.

10. A machine-tool of the nature disclosed combining a frame-unit; a casing secured to the front side thereof; a power-driven shaft extending into said casing and terminating at the front side thereof; a table slidable transversely on the frame-unit; a feed-screw journaled on and reciprocating with said table; a feed-change mechanism in said casing establishing operative connection therebetween; and hand-operating instrumentality journaled at the front side of said casing and located forward of the longitudinal front edge of said table.

11. A machine-tool organization combining a tool-supporting member; a table; a frame-unit on which said member is mounted; a second frame-unit slidably connected with said first frame-unit to afford a relative vertical movement therebetween whereby the distance between said tool-supporting member and said table may be varied; means comprising another frame-unit intervening between said table and said second frame-unit and constructed to provide for a relative movement in two transverse horizontal directions between said table and said second frame-unit; a feed-change mechanism mounted directly on said last-mentioned frame-unit in underlying relation with the path of feed of said table; a prime-mover mounted on one of said frame units; and a transmission extending from said prime-mover through said feed-change mechanism to said table to propel it at a rate determined by said feed-change mechanism; and means mounted on said other frame-unit for manually adjusting said feed-change mechanism.

12. A machine-tool of the nature disclosed combining a frame-unit; a feed-change box mounted at the front side thereof; an elongated table slidably mounted upon said frame-unit above said box; a feed-screw journaled on the under side of said table and reciprocating relatively to said box; and hand-controlling means pivoted to the front side of said box and located near the longitudinal front edge of said table.

13. A machine-tool organization combining a spindle-supporting member; a spindle in journaled relation with said member; a frame-unit constituting a foundation for the machine-tool and adjustably supporting the weight of said parts; a table overlying said foundation frame-unit and having its weight supported thereby; a feed-change mechanism mounted immediately below said table but out of the path of movement thereof; a table-propelling transmission extending through said feed-change mechanism to said table to effect a relative feed of said table at a rate determined by said feed-change mechanism; and a manually operable element arranged immediately adjacent said table and constituting means for controlling said feed-change mechanism, whereby the rate of relative feed between the spindle and the table may be varied.

14. A machine-tool organization combining feed-change mechanism; a frame-unit providing a first slide-way and a second slide-way disposed at right angles to said first slide-way; a spindle; a casing carried by said frame-unit and projecting laterally from the upright side thereof that extends parallel to the spindle; i. e., feed-change mechanism being carried by said frame-unit housed by said casing; a table overlying said frame-unit and adapted to feed transversely to said upright side thereof to bring one end of said table over said casing; another frame-unit coöperating with said second slide-way; a spindle-supporting member; means for mounting said spindle-supporting member on said other frame-unit; hand-operating means mounted on one side of said casing for manually controlling said feed-change mechanism; and a transmission extending through said feed-change mechanism for propelling the table at the rate of feed determined thereby.

15. A machine-tool organization combining a tool-supporting member; a table; a frame-unit on which said member is mounted; a second frame-unit slidably connected with said first frame-unit whereby the distance between said tool-supporting member and said member may be varied; means comprising a third frame-unit intervening between said table and said second-frame-unit and constructed to provide for a relative movement in two transverse horizontal directions between said table and said second frame-unit; a feed-change mechanism mounted directly on one of said frame-units in underlying relation with the path of feed of said table; a prime-mover mounted on another one of said frame-units; and a transmission extending from said prime-mover through said feed-change mechanism to said table to propel it at a rate determined by said feed-change mechanism; and means mounted on said other frame-unit for manually adjusting said feed-change mechanism.

16. A machine-tool organization combining a spindle-supporting member; a spindle in journaled relation with said member; a table; a frame-unit constituting a foundation for the machine-tool and adjustably supporting the weight of said parts and also slidably supporting said table; a casing mounted on the front side of said foundation frame-unit and positioned in underlying relation with said table below the path of movement thereof; a feed-change mechanism housed by said casing; a table-propelling transmission extending into said casing and through said feed-change mechanism to said table to effect a relative feed of said table at a rate determined by said feed-change mechanism; and a manually operable element arranged on a vertical face of said casing and immediately adjacent a longitudinal edge of said table and constituting means for controlling said feed-change mechanism, whereby the rate of relative feed between the spindle and the table may be varied.

It witness whereof, I hereunto subscribe my name, as attested by the two subscribing witnesses.

ADOLPH L. DE LEEUW.

Witnesses:
CHARLES F. LITTNER, Jr.,
HERMAN R. E. VON LEHN.